United States Patent [19]

Schumacher et al.

[11] Patent Number: 6,038,664

[45] Date of Patent: Mar. 14, 2000

[54] METHOD FOR SELECTING COMMUNICATION ACCESS METHOD FOR LOCAL AREA NETWORKS

[75] Inventors: Michael K. Schumacher, Waterford; Paul E. Tomczak, Bloomfield Hills, both of Mich.

[73] Assignee: Cubix Corporation, Carson City, Nev.

[21] Appl. No.: 08/698,175

[22] Filed: Aug. 15, 1996

Related U.S. Application Data

[60] Provisional application No. 60/019,479, Jun. 10, 1996.

[51] Int. Cl.[7] .................................................... G06F 13/00
[52] U.S. Cl. ............................................. 713/2; 709/217
[58] Field of Search ....................... 395/200.47, 200.56, 395/200.33, 200.57, 187.01, 182.02, 200.58; 711/118; 713/2; 709/217, 218, 219, 227

[56] References Cited

U.S. PATENT DOCUMENTS

| | | | |
|---|---|---|---|
| 5,124,909 | 6/1992 | Blakely et al. | 395/200.33 |
| 5,375,207 | 12/1994 | Blakely et al. | 395/200.57 |
| 5,442,791 | 8/1995 | Wrabetz et al. | 395/200.56 |
| 5,682,514 | 10/1997 | Yohe et al. | 711/118 |
| 5,699,518 | 12/1997 | Held et al. | 395/200.54 |
| 5,774,660 | 6/1998 | Brendel et al. | 395/200.33 |
| 5,802,304 | 9/1998 | Stone | 395/200.57 |

OTHER PUBLICATIONS

Kyle Marsh, Win32 Hooks, Microsoft Developer Network Technology Group, pp. 1–17, Feb. 1994.

Matt Peitrak, Intercepting API functions in Win32 (PC Tech; Power Programming), PC Magazine, pp. 1–8, (full text only), Nov. 1994.

Author unknown, *Remote node vs. Remote control* (choosing methods for remote access networks), VARbusiness, pp. 1–2 (full text only), Apr. 1995.

Anita Karve, Going the distance (remote access for telecommuting) (includes related article on two different types of remote access), LAN Magazine, pp. 1–8, Jun. 1995.

George A. Thompson, How remote can you go? (includes a related article on factors driving the remote–access market), HP Professional, pp. 1–8, Aug. 1995.

James R. Lyle et al., Load Balancing From a Unix Shell, IEEE/IEE Online Publications, pp. 181–183, Dec. 1988.

Anna Hac et al., Dynamic Load Balancing in a distributed System Using a Sender–Initiated Algorithm, pp. 172–180, Dec. 1988.

Microsoft Systems Journal 1994, Author: James Finnegan, Title: Hook and Monitor Any 16–bit Windows™ Function with Our ProcHook DLL.

*Primary Examiner*—Zarni Maung
*Assistant Examiner*—Patrice Winder
*Attorney, Agent, or Firm*—Ian F. Burns

[57] ABSTRACT

A method is provided for selecting between various communication access methods for client computers which are connected to a computer network. When a client computer attempts to load an application program, the system loader on the client computer is hooked or paused. A preset configuration may be evaluated to determine if the user will be prompted to select an access method, if a particular access method is preset, or if a rules database will be evaluated to select an access method. If a Remote Node access method is selected, the system loader is unpaused and the selected program is allowed to run on the remote user's computer. If a Remote Control access method is selected, a remote control program is executed at the server. A load balancing algorithm may be used to determine which server will be used if a plurality of servers are available on the computer network for hosting a Remote Control session.

35 Claims, 4 Drawing Sheets

Microfiche Appendix Included
(3 Microfiche, 161 Pages)

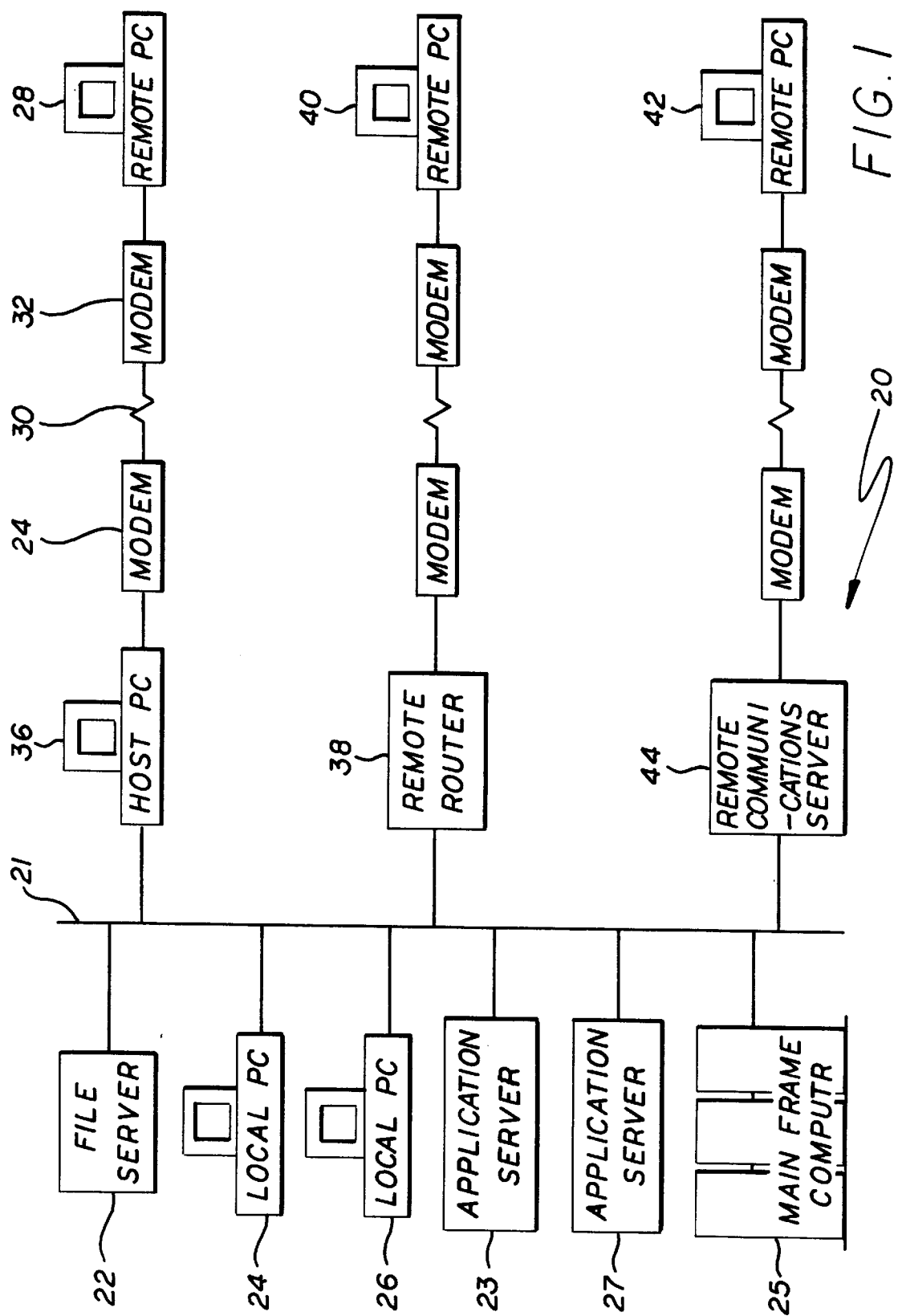

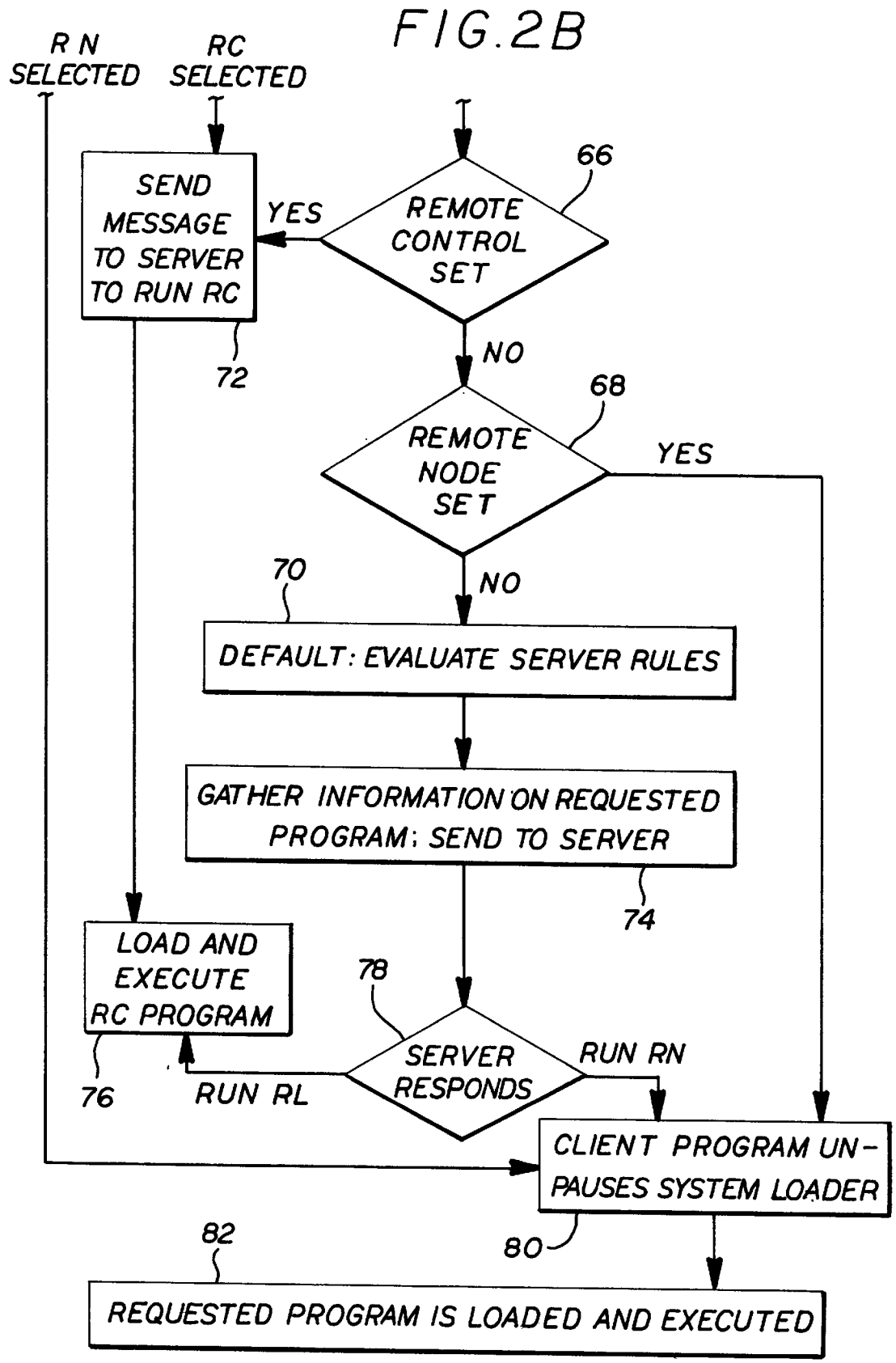

METHOD FOR SELECTING COMMUNICATION ACCESS METHOD FOR LOCAL AREA NETWORKS

CROSS REFERENCES TO RELATED APPLICATIONS

This application is based on provisional patent application 60/019,479 which was filed on Jun. 10, 1996.

REFERENCE TO MICROFICHE APPENDIX

This application includes Appendix A (3 fiches; 161 frames) which is submitted in microfiche form

NOTICE OF COPYRIGHT OWNERSHIP

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyrights whatsoever.

BACKGROUND OF INVENTION

1. Field of the Invention

This invention relates to a method for selecting between Remote Node, Remote Control, or other communication access method for computers which are connected to a local area network 2. Description of Prior Art Local area networks (LANs) and other computer networks are often accessed by persons from a remote site. These users may need to perform a variety of tasks such as transferring program or data files, editing files stored on the LAN, operating programs stored on the LAN, and sending and receiving messages. However, the speed with which tasks may be performed remotely is limited by the connection between the remote site and the LAN. LANs generally use specially designed communication links which allow high speed communication between the nodes of the LAN. An Ethernet LAN, for example, can currently transfer data at 100,000,000 bits per second.

Remote users do not have access to the specially designed communication links of the LAN and must generally rely upon analog telephone lines or, in some cases, digital communication lines such as ISDN lines. The fastest data transfer rate currently available on most telephone lines and ISDN lines is 33,600 and 128,000 bits per second, respectively. Consequently, the speed of communication between the remote user and the LAN is substantially slower than the speed of communication within the LAN itself This slower communication rate can create a significant problem for some remote users. If the user wishes to transfer a large file or program between a LAN and the remote user's computer, the time required to transfer the file may be prohibitively long. Other users may seldom need to transfer large files and are, therefore, not greatly effected by a slow communication rate.

Although local computers directly connected to a LAN generally run as nodes on the LAN, it is sometimes desirable to use a different access method. For example, a particular computer may have obsolete communication equipment which cannot communicate at normal LAN speeds. In this situation, normal LAN access methods may be unacceptably slow.

In order to meet the needs of various users, a number of different methods of communication have been developed. The two most common methods are called Remote Control and Remote Node. Each method has advantages and disadvantages and each method is best suited for different applications.

Remote Control

The Remote Control method enables a user to connect to a remote LAN and seize control of a computer on the LAN. The seized or host computer operates as any other computer on the LAN and it is able to communicate with other devices on the LAN at normal LAN speeds. The host computer in a remote control environment may serve either a single user or multiple users concurrently. The latter configuration is commonly referred to as an "Access Server" or "Application Server." To perform operations, the remote user enters commands into the remote or client computer which in turn transmits the commands to the LAN-based host computer by way of a communication line. The commands are executed by the host computer and screen data is transferred back to the remote computer to show the user the results of his commands.

The Remote Control method is best suited to situations where large files must be accessed. Because only screen data is transferred to the remote computer and not an entire file, the remote user can access large files and perform complex tasks while maintaining adequate display speeds for the program's output.

Remote Control has the inherent disadvantage of requiring more equipment than other remote access methods. Both a client computer and host computer are required thereby increasing the total cost and complexity and reducing reliability. In addition, specialized software is required and the user interface of the application software is usually different than the normal LAN-based operation of the software. The different user interface increases training costs and complexity of operation for the remote user.

Remote Node

The Remote Node method allows a remote computer to operate like a computer on a remote LAN. A remote computer can access other devices on the LAN and can perform tasks just as if the computer was a node on the LAN. The remote computer gains access to the LAN through a remote communications server which interfaces between the LAN and a communication line used by the remote computer.

The Remote Node method requires less equipment and software than the Remote Control method, and the remote user's application executes the same as if he were working directly on one of the LAN's nodes with the only difference being communication speed versus LAN speed. Consequently, the Remote Node method is less complicated and less expensive to implement than the Remote Control method.

The most significant disadvantage of the Remote Node method is the speed at which data may be transferred. Unlike the Remote Control method, if the user wishes to access a file which is stored on the LAN, the file must usually be transferred to the remote user. If the file is large, a large amount of time may be required to transfer the file.

What has long been needed is an efficient means for selecting between various access methods. The best access method for a particular situation depends upon a number of variables, such as the application program which is to be run, the load on the LAN's servers, whether the software is located on the client computer or a LAN-based server, and the size of the application files. No means currently exist that can evaluate these variables and select the most appropriate access method.

Although the capability exists for users to manually select between the two access methods, this does not always lead to the best selection. Most users do not understand the distinctions between the different kinds of access methods and cannot accurately select the best method for their particular application. Furthermore, the user usually does not have convenient access to information which is necessary to select the best method. Such information may include the current activity on the LAN.

OBJECTS AND ADVANTAGES

The present invention is intended to provide at least the following:

(a) A method for selecting between Remote Control or Remote Node access methods for local area networks;

(b) The method in (a) such that a remote user may not be required to understand the different remote access methods and may not be required to select the appropriate method;

(c) The method in (a) such that the access method may be selected based upon a preset program configuration in the remote user's computer and/or host computers or access servers on the LAN;

(d) The method in (a) such that the selection between remote access methods may be based upon a set of rules which is set by a LAN administrator;

(e) The method in (d) such that the access method may be selected based upon the current load on host computers or access servers on the network;

(f) The method in (e) such that when the Remote Control method is selected, a server is selected to host the session based upon a load balancing algorithm;

(g) The method in (a) such that the method is flexible and responsive to the needs of the particular LAN and remote user;

(h) The method in (a) such that LAN resources may be used more efficiently.

SUMMARY OF THE INVENTION

The method of the present invention is implemented by a software program which may select between Remote Control, Remote Node, or other access methods for a client computer which is connecting to a computer network such as a local area network. The invention effectively combines the two access methods into a seamless system so that the most efficient method may be selected with little or no involvement by the user.

The present invention comprises two major components; a client program (CP) and a server program (SP). The CP runs in a remote or client computer and the SP runs in a server which is directly connected to a LAN.

The SP comprises a number of primary components: a management interface, a rules database, rule evaluation software, and communication software. The management interface component allows a LAN administrator to manipulate the rules database and perform various other management tasks. The rules database is a set of rules composed by the LAN administrator to determine which access method will be used for a user session if the rules database is used to make the determination. The rule evaluation software evaluates the rules database and performs any functions associated with the rules database. The communication software allows the SP to communicate with the CP. The SP may also comprise a load balancing algorithm which is used to balance usage in multiple host platforms.

The CP is resident in the remote computer and is activated when the user selects a program to run. When this occurs, the CP causes the system loader of the operating system to freeze or pause before it runs the requested program. The software mechanism used to pause the system loader varies according to the requirements of the particular operating system.

The CP executes a subroutine to determine if the user has access to the requested program. If the user has access, the program will evaluate the program's preset configuration. The preset configuration may direct the program to run via a particular access method, prompt the user to choose an access method, or evaluate the rules database. If the rules evaluation is directed by the preset configuration, the CP collects information about the requested program and transmits this information along with a request for rule evaluation to the server. The rule evaluation software evaluates the rules and determines which method should be used. If the Remote Control method is selected, a load balancing algorithm may be used to select an application server to host the remote control session.

If the SP determines that the requested program should be run in Remote Control mode, the server will transmit a message which includes the address of the server which will host the session. In this event, the CP will load and run a Remote Control program which configures the client computer to run in the Remote Control mode. If the SP selects the Remote Node method, the server will transmit a message to this effect to the client computer. In this event, the CP will un-pause the operating system and allow it to load and run the requested program. Other access methods may also be selected in which case the client computer and server are appropriately configured.

BRIEF DESCRIPTION OF THE DRAWINGS

FIG. 1 is a schematic diagram demonstrating various hardware configurations in which computers may access a computer network or LAN.

FIG. 2B is a continuation of the flowchart diagram of FIG. 2A showing the operation of the client portion of the method of the present invention.

REFERENCE NUMERALS

Figure 2A:
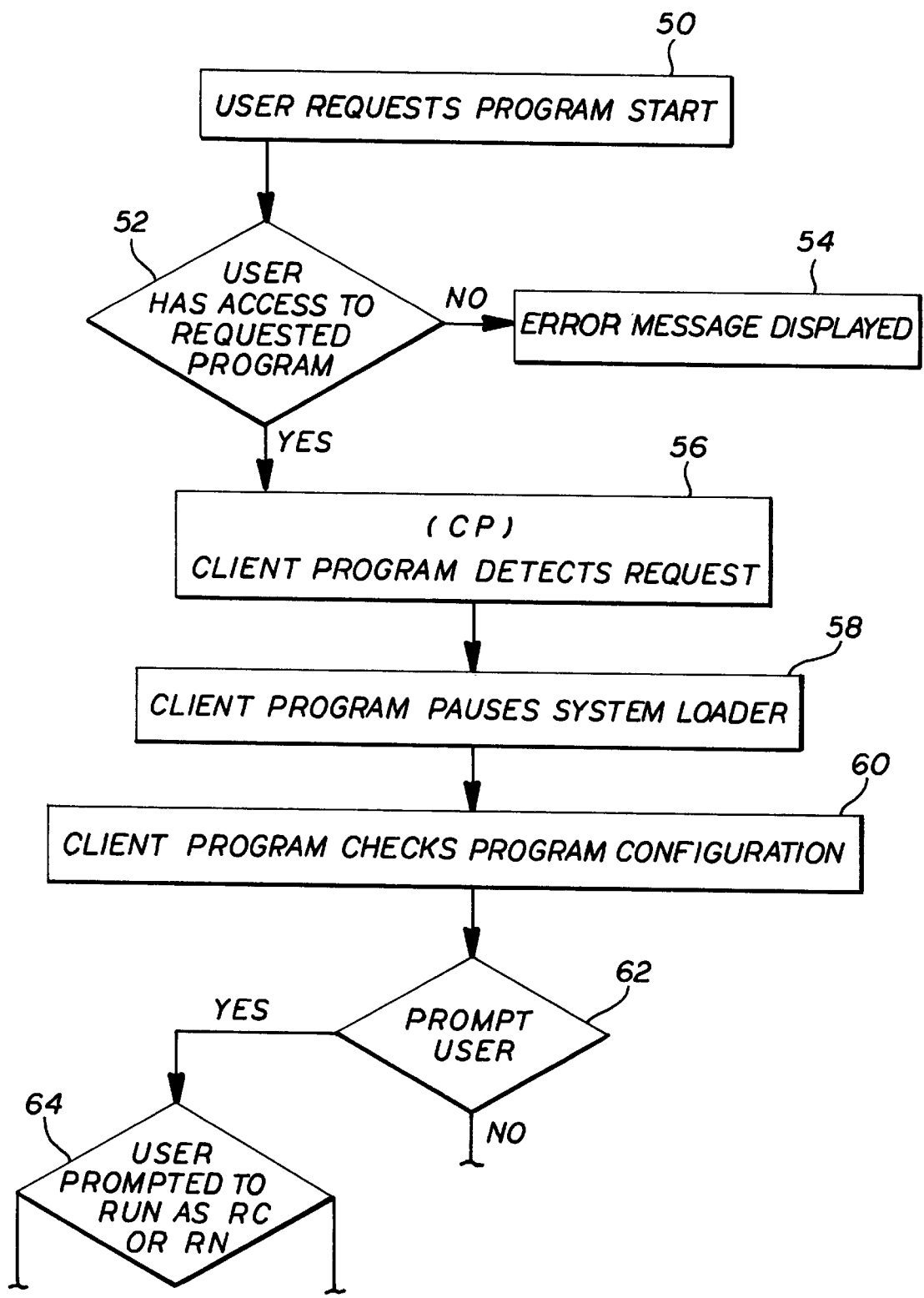
FIG. 2A is a flow chart diagram showing the operation of the client portion of the method of the present invention.

20 LAN
21 LAN connection
22 file server
24 local personal computer (PC)
25 main frame computer
26 local personal computer (PC)
27 application server
28 remote PC
30 phone line
32 modem 34 modem
36 host PC
38 remote router
40 remote PC
42 remote PC
44 remote communications server
50 user requests program start
52 user has access to requested program
54 error message displayed
56 client program detects request
58 client program pauses system loader
60 client program checks program configuration
62 prompt user
64 user prompted to run as RC or RN
66 remote control set
68 remote node set
70 default: evaluate server rules
72 send message to server to run RC
74 gather information on requested program; send to server
76 load and execute RC program
78 server responds
80 client program un-pauses system loader
82 requested program is loaded and executed
90 server receives message from client
92 remote control set at client
94 request for rule evaluation with program information
96 perform other function
98 server executes rule evaluation program
99 rules database
100 server selects access method
102 send requests for bids on new session to all domain servers
104 response time
106 send message to client to run as remote node
108 send message to client to run as remote control and send bidder address

DESCRIPTION OF THE PREFERRED EMBODIMENT

FIG. 1 illustrates various hardware configurations in which a remote computer may access a computer network or a LAN. A LAN 20 is formed by a LAN connection 21 which may have many nodes. Various devices may be connected to the LAN, such as a file server 22, local personal computers (PC's) 24 and 26, an application servers 23 and 27, and main frame computer 25.

A remote PC 28 is located where it may not have direct access to LAN connection 21. To access LAN 20, remote PC 28 uses a standard phone line 30 and a modem 32. Phone line 30 may also be an ISDN line or other communication line. A modem 34 interfaces phone line 30 with a host PC 36. Modem 32 and 34 may also be other kinds of communication interface devices. Host PC 36 may communicate with any of the nodes on LAN 20, run programs, and manipulate files. An alternative configuration allows a remote PC 40 to access LAN 20 through a remote router 38. Remote router 38 may route or transmit to and from any of the devices on LAN 20. This allows PC 40 using remote control software, to use any remote access servers or remote control host computers via the connection.

Yet another configuration connects remote PC 42 to a remote access server 44. Remote access server 44 functions as a host computer except that it is generally used to serve only remote users.

All of the configurations discussed above can be used to run either the Remote Control or Remote Node access methods. However, the Remote Control method is most commonly run in the first configuration with remote PC 28 and host PC 36. The method and program of the present invention may also be used with any of the configurations discussed above. In some cases, the Remote Node method may not be available in the first configuration with remote PC 28 and host PC 36. In the preferred embodiment, the present invention is used with a remote communication server which is also the most common configuration in remote LAN access situations.

The present invention may also be used with local PC's which are directly connected to a LAN, such as PCS 24 and 26. In some situations, a local PC may perform an operation which is best suited to a Remote Control method rather than the usual LAN method. The present invention may also be used to select the most suitable method for locally connected computers.

The present invention comprises a method for selecting between Remote Control, Remote Node, and other access methods and a software program for implementing the method. The program comprises two main elements; a server program (SP) and a client program (CP). The SP is installed in a server or computer which is directly linked to a LAN. The CP is installed in a remote client computer.

The SP may be designed to run on any operating system. The current embodiment disclosed in Appendix A is designed to run on CITRIX WINFRAME 1.6 (a trademark of Citrix Corporation). Similarly, the CP may be designed for any operating system. The servers used to run the SP are collected into logical domains. Each server which will be accessed by remote clients requires the SP.

CLIENT PROGRAM

Client computers must have the CP on their computers. This software may be installed using a setup program The CP may be an option, along with remote node support and dial-out capabilities, that may be selected by the user. A network administrator may answer all setup questions for the user using a client configuration utility.

The CP may be started via an icon (or command line for DOS users). The CP may be terminated without terminating an active remote computing session and without rebooting. The CP is non-intrusive and will remain unnoticed by most users.

When loaded, the CP monitors all application startup events initiated on the computer. Typically, such application startup events occur as a result of a user clicking an icon or selecting an application from a start menu.

A typical user session begins with a remote user booting up his computer and connecting to a LAN. The user may use any of a number of communication software packages to establish communication with the LAN.

FIGS. 2A and 2B, the user, once connected to the LAN, decides to run a particular application program 50. The program may be any program such as a word processing program or a spread sheet program. Once the user requests the program, the operating system may determine whether the user has access to the requested program 52. The user has access if all of the necessary software is accessible to the user. If the user does not have access, an error message will be displayed 54 and the CP will return to waiting for user input.

If the user has access to the requested program, the CP detects the user's request 56 and performs a hooking operation which pauses or freezes the operating system loader 58 before the requested program is loaded. The method used to pause the operating system loader varies according to the particular operating system in use. The following is a description of the pausing operation for four common operating systems.

MS-DOS

To monitor and control program load events in DOS (a trademark of Microsoft Corporation), the CP installs an interrupt vector handler. Specifically, the CP hooks interrupt calls from programs to Interrupt 21, sub-function 4B. When this interrupt event occurs, the name of the program being loaded and the command line parameters are available from pointers using the register pairs DS:DX and ES:BX, respectively.

Once the CP has obtained the program name, command line, file size, etc., the common CP algorithm (discussed below) of contacting the server to determine the run mode of the program being loaded is exercised. If the program is to be run in the Remote Node mode, the CP will simply return control back to the system without modification, allowing the program to execute on the local machine. If the current program being loaded should be run in Remote Control mode, the CP will replace the name of the program stored in the DS:DX register with the name of the remote control host program (the Citrix client), and the command line parameter stored in the ES:BX register will be set to the name of the program that should be run in Remote Control mode. In this case, when the CP returns control to the operating system, the Remote Control program will start instead of the program specified at the system command prompt.

WINDOWS 3.1x

The CP uses two techniques simultaneously to monitor and control program load events in WINDOWS 3.1x (a trademark of Microsoft Corporation). Programs that are invoked from the WINDOWS desktop (i.e. program manager) can be monitored and controlled via a hook of the WINDOWS Kernel function "LoadModule," described below. To monitor and control program load events that occur with an "MS-DOS prompt window," the CP uses the same technique that is used for the native DOS environment described above.

In WINDOWS 3.1x, a single copy of each system Dynamic Link Library (DLL) is shared by all programs (including the program manager) that are currently running on the machine. Therefore, the CP is able to monitor and control all program load events from any source, except a DOS window, via a single hook to a shared copy of the system "LoadModule" routine.

To hook the "LoadModule" function, the CP makes use of an undocumented WINDOWS function, "AllocCStoDSAlias," that permits the CP to change data in the Code Segment of WINDOWS system components. Specifically, the CP obtains a pointer to the WINDOWS version of "LoadModule" and overwrites this address with a pointer to the CP version of "LoadModule." This operation is analogous to installing an interrupt vector handler in DOS.

When program load events occur, the CP's LoadModule function is called. The name of the program that is about to be loaded and any command line parameters are passed as function parameters to the CP LoadModule function. Once the program name and command line parameters of the program which is about to be loaded are known, the operation of the CP for WINDOWS 3.1x is similar to that of the CP for DOS. The server on the LAN is contacted to establish the run-mode of the program about to be launched. If the program currently being launched should run in Remote Node mode, the CP temporarily unhooks the system LoadModule call and itself calls LoadModule with the unaltered parameters that were passed into the CP hook. keyboard events, is that the DLL, which established this hook, will be loaded into the process memory context of every process running on the machine. After the hook is set, the loader DLL keeps track of all processes that try to load a copy of the loader. When the operating system shell (Program Manager or Explorer) loads the loader DLL, it will be running in the same process context as the shell program. At this time the loader, under the auspices of a shell program, loads (via the WINDOWS "LoadLibrary" call) a CP runtime DLL. The runtime DLL being loaded by the shell program can then proceed to replace the shell's instance of "CreateProcess" with the CP version of this function. To perform this redirection, the CP runtime DLL replaces the shell program's Dynamic Link to the initial instance of "CreateProcess" from the "KERNEL32.DLL" system DLL to the CP's version of "CreateProcess" located within the code body of the runtime DLL itself. With the operating system shell's "CreateProcess" effectively replaced with the CP version, the CP's subsequent operation is functionally equivalent to that of the "LoadModule" hook for WINDOWS 3.1x described above.

Returning to FIGS. 2A and 2B, once the CP has effectively paused or hooked the operating system loader 58, the CP will then check the program configuration 60. For the selected program, the configuration may be preset to use a particular access method, to prompt the user to select the access method, or to request rule evaluation from the server. If the Remote Control method is preset 66, the CP will send a message to the server to run in Remote Control mode 72 and the CP will await a response from the SP indicating it should load and execute the remote control program 76. If the Remote Node method is preset 68, the CP will un-pause the system loader 80 which will then load the requested program 82. If the user prompt is preset 62, the CP will ask the user to select an access method 64. The user will then choose one of the methods and the CP will follow the procedure discussed above for that method. If rule evaluation is set 70, the CP will request the server to evaluate the rules database and determine which method to use 74. It is understood that the same result may be achieved if the order of evaluation is changed and the default is different.

To request rule evaluation, the CP will first gather information on the requested program. This information may include file name, file size, drive name, file path, time of day, drive type, user name, user password, client computer configuration, etc. The CP will then send this information along with a request for rule evaluation to the server.

SERVER PROGRAM

Figure 3:
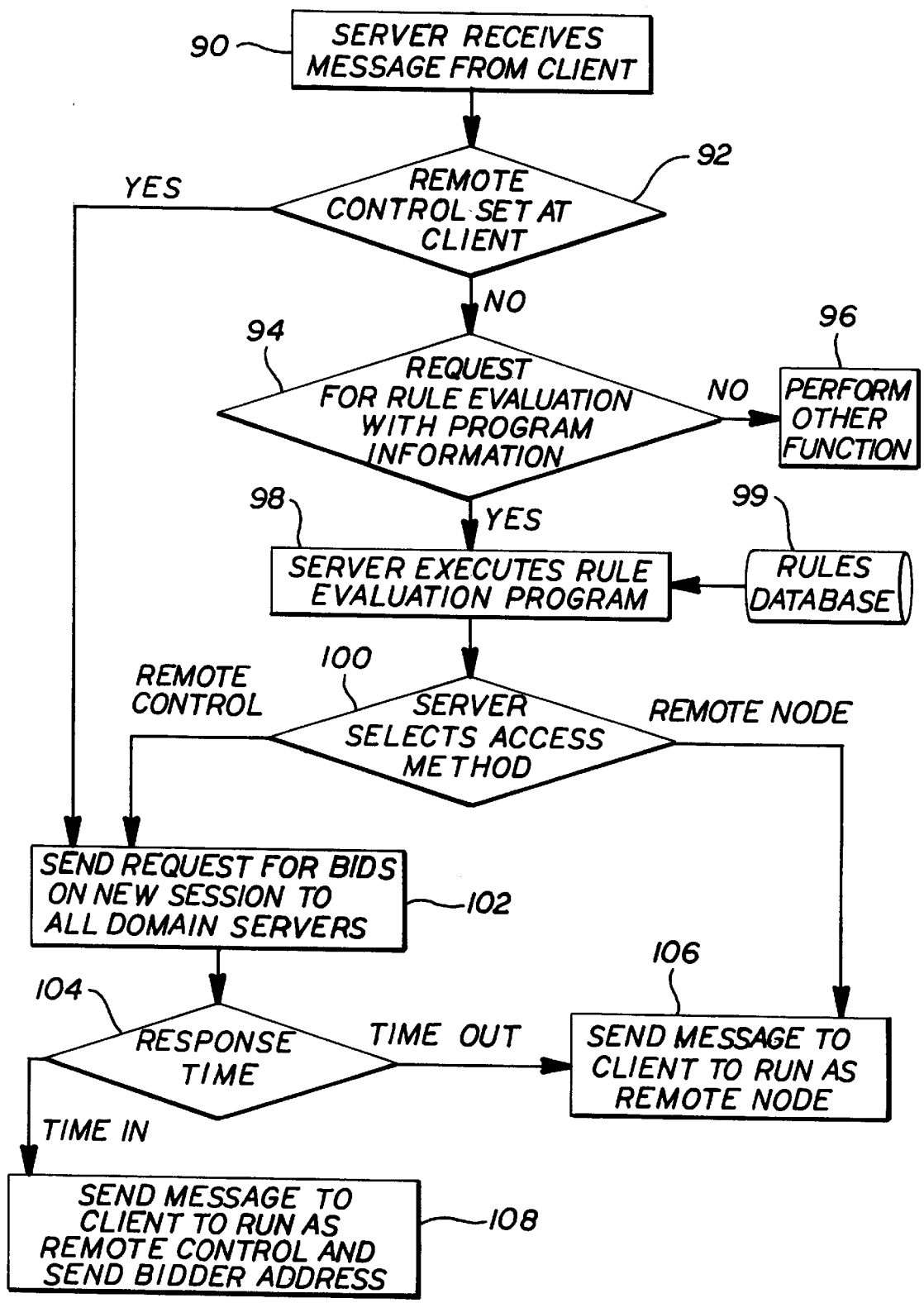
FIG. 3 is a flow chart diagram showing the operation of the server portion of the method of the present invention.

As seen in FIG. 3, when the SP receives a message from the client computer 90, it begins to evaluate the message. The message may indicate that the Remote Control method was selected at the client computer 92. This may have been a result of the user's prompt 64 or the preset configuration 66. In this event, the SP sends requests for bids on the new session to all cluster servers 102. This step determines which server will be given the new session. If the servers do not respond within a predetermined time, the SP may reach a timeout condition 104 and default to the Remote Node method 106. It is assumed that if none of the cluster servers respond within a specified time, they are all occupied with other tasks and would not be able to accommodate another Remote Control user session. If an appropriate response is received within the specified time, the server will send a message to the client to run in the Remote Control mode along with the address of the cluster server that will host the session 108.

LOAD BALANCING ALGORITHM

The SP may use a load balancing algorithm to balance usage among the LAN servers. In the preferred embodiment, the SP uses a distributed load balancing algorithm based on a simple broadcast protocol. Each server participating in the load balancing performs as an autonomous system, submitting bids based on offered load. The server determines the best system to host the new session by offering the new load to all servers in the cluster. If the program is to run in Remote Control mode, the CP will call the WINDOWS function "WinExec" to load the Remote Control program with the name of the program to run in Remote Control mode as the only command line parameter.

WINDOWS 95/WINDOWS NT

The CP uses the same code and the same technique to monitor and control program load events under both WINDOWS 95 and WINDOWS NT (trademarks of Microsoft Corporation). The actual technique employed is similar to that used in WINDOWS 3.1x. An operating system function for program loading is hooked and replaced with the CP version, in this case the WINDOWS function "CreateProcess" is hooked. Unlike WINDOWS 3.1x, in the 32 bit protected WINDOWS operating systems WINDOWS 95 and WINDOWS NT, each process currently running on the machine is given its own private copy of operating system DLL functions, including "CreateProcess."

The CP obtains access to program load events that occur from within the WINDOWS desktop (i.e. from user interaction with program manager or explorer) by hooking the instance of CreateProcess that is associated with the operating system desktop/shell program. The desktop/shell program is "PROGRAM.EXE" (Program Manager) for WINDOWS NT through version 3.51 and "EXPLORER-EXE" (Explorer) for WINDOWS 95 and WINDOWS NT after version 3.51.

To successfully hook the WINDOWS shell program's instance of "CreateProcess," the CP must run the hook installation code within the thread context of the shell program. This is accomplished using two CP Dynamic Link Library (DLL) modules. Within a "loader" DLL, a system wide event hook is set using the WINDOWS "SetWindowsHookEx" function. A side effect of "SetWindowsHookEx' which can, for example, be used to globally monitor all mouse or To offer a new load to servers in the cluster, the server broadcasts an Allocate Session Request message. The server sending the Allocate Session Request message is said to be the "Offering Server." This message is received by all servers in the cluster, including the server that initially transmitted the message. The Offering Server waits for offers from other servers to host the session. The first response received is considered to be the best system to host the session. Any subsequent responses are discarded. If no response is received within a specified time limit, no system is able to host the session and an appropriate response is sent to the client.

Upon receipt of an Allocate Session Request message, each server determines a backoff time that it waits before responding with an Allocate Session Response message. Offering Server, in addition to its offering server role, also performs the role of a responding server like all other cluster servers. The backoff time is calculated such that a less desirable system will incur a longer backoff dely than more desirable systems. Hence, the best system to handle the new load will make the first offer to host the new session.

Backoff time is determined based on a mathematical calculation that takes into account a number of system performance variables. Factors currently considered are historical CPU utilization, whether or not the application to be started in the new session is already loaded into memory on behalf of other users, whether or not a point to point client network connection via serial link exists at the server, and the type and number of CPUs installed in the system. The weighting of backoff factors is partially adjustable via a management interface. Once the backoff calculation is completed, the Allocate Session Request is queued and a timer is set for the calculated backoff interval.

If the backoff timer expires, the Allocate Session Request is dequeued and processed. The server next determines whether it will respond with an Allocate Session Response. A server responds to the Allocate Session Request with an Allocate Session Response if and only if it is capable of hosting the new session. If the server is unable to host the new sessions, the request is discarded. If an Allocate Session Response is transmitted, it is broadcast to all servers in the cluster.

Upon receipt of an Allocate Session Response broadcast, each server in the cluster checks to see if it has the corresponding request queued pending expiration of the backoff timer. If it does, the backoff time is stopped and the request is dequeued and discarded. If it does not, the Response is ignored. This feature reduces network traffic by minimizing the number of responses sent within the cluster.

The Offering Server, in addition to normal processing performed by all cluster servers, performs special handling of the Allocate Session Response. It checks to see if the response received is the first response received. If it is, response is transmitted to the client that originated the request (containing the address of the best server), and the transaction is considered completed. Any subsequent "late" responses are discarded. Late responses may occur when two servers send responses at nearly the same time.

Returning to the top of FIG. 3, if the message received from the client 90 does not request the Remote Control method, the SP determines if it is requesting rules evaluation 94. If the message requests rules evaluation, the server will execute the rule evaluation program 98 using rules stored in a rules database 99. The rule evaluation program will evaluate each of the rules, which has been entered by the network administrator and determine which method will be used 100. It is understood that the rule evaluation portion of the algorithm may be performed at another LAN device or at the client computer.

RULES DATABASE

Rules database 99 is used to store rules for selecting which access method is to be used for a particular application. The rules are formed by combining built-in keywords, variables, values, and operators. Possible keywords or variables may represent file location, file size, file path, file name, time of day, user, group, and server cluster. Operators may include AND, OR, EQUAL, LESS THAN, and GREATER THAN. Many other operators may be used to perform other functions. Values may be entered as required for each keyword. A rule may be written as "If<expression>then<result>," where the "result" is a directive to operate the program in Remote Control or Remote Node access method. A default is supplied for the case where no rule is satisfied. Rules are evaluated in an order directed by the administrator. If an "expression" in a rule is evaluated to be true, the "result" is executed.

Rules are collected into ordered lists, and may be assigned to a single user, a group of users, or the entire cluster. A cluster is a collection of independent systems that work together as a single system. A client interacts with a cluster as a single system. The primary benefits of clustering are availability and scalability. Evaluation stops when a rule evaluates to "true," and the action specified in the "then" clause is taken. If no rule evaluates to "true," the specified cluster default action is taken.

Rules are automatically synchronized among all servers in a cluster. New servers automatically receive the current rule set when they join a cluster. Each server in the cluster operates independently, and can thus remain fully operational in the presence of faults at one or all other servers in the cluster.

Below are two examples of how a series of rules can be combined in an ordered list to create a rules database. A rules database may contain rules at the user scope, group scope, and cluster scope. The syntax of rules is independent of the scope of the rule. When an application is to be started, evaluation proceeds in order from the user scope to the group scope to the cluster scope. In the following examples, only the cluster scope is used.

EXAMPLE 1:

IF (%FileName=WINWORD.EXE) THEN Run at Server

IF (%FileName=EXCEL.EXE) THEN Run at Server

IF (%FileName=PAINT.EXE) THEN Run at Client

IF (%Drive=Z:) THEN Run at Client

IF (%DriveType=NETWORK) AND (%FileSize>75000) THEN Rum At Server

If No Rule Matches, Run At Client

In the above example, the applications "WINWORD" and "EXCEL" will always be executed using the Remote Control method. The application "PAINT" will always be executed using the Remote Node method. All other applications that reside on logical drive Z: will be executed using the Remote Node method. All applications that do not match one of the previous rules that reside on a network drive and are larger than 75000 bytes in size will execute using the Remote Control method. Applications that do not match any of these rules will be executed using the Remote Node method.

EXAMPLE 2:

IF (%FileName=INTERNDB.EXE) AND (%TimeOfDay)>1700) AND (%TimeOfDay<2100) THEN Run At Client IF (%FileName=INTERNDB.EXE) THEN Run At Server IF (%FileName=MSVC.EXE) THEN Run At Server COMPILE1

IF (%Path=\MSOFFICE) THEN Run At Server

IF (%DriveType=LOCAL) OR (%FileSize<75000) THEN Run At Client

If No Rule Matches, Run At Server

In the above example, the application 'INTERNDB.EXE" is executed using the Remote Node method between 5:00 p.m. and 9:00 p.m. but is executed using the Remote Control method outside of these hours. The application "MSVC.EXE" is always executed using the Remote Control method on the remote control host "COMPILE1." All other applications that reside under the "\MSOFFICE" path are executed using the Remote Control method. All remaining applications that are either located on a local disk drive or are less than 75000 bytes in size are executed using the Remote Node method. Applications that do not match any of these rules will be executed using the Remote Control method.

If the program selects the Remote Control method, the server will send request for bids and continue as discussed above. If the program selects the Remote Node, the SP will send a message to the client to run as Remote Node.

Returning to FIGS. 2A and 2B, when the client receives a response from the server, it will either load and execute a remote control program 76 if the Remote Control method is selected, or unpause the system loader 80 if the Remote Node method is selected. If the former occurs, the application operates as it normally would in the Remote Control mode. If the latter occurs, the client computer loads and executes the requested program 82 and the application operates as it normally would in the Remote Node method. If another access method is selected by the SP, the client computer may be appropriately configured to run the selected access method.

Although the description above and Appendix A contain many specifications, these should not be construed as limiting the scope of the invention but as merely providing illustrations of some of the presently preferred embodiments of this invention. Thus, the scope of the invention should be determined by the appended claims and their legal equivalents rather than by the examples given.

What is claimed is:

1. A method for selecting an access method for application programs used by a client computer which is connected to a computer network, the client computer having a system loader for loading application programs, comprising the steps of (a) pausing the system loader before the system loader loads an application program, and (b) selecting an access method based upon an evaluation of at least one predetermined rule, wherein the access method may be selected based on the predetermined rule.

2. The method of claim 1 further comprising the step of un-pausing the system loader and allowing the application program to run if a remote node access method is selected.

3. The method of claim 1 further comprising the step of configuring the client computer and the computer network to run in remote control mode if a remote control access method is selected.

4. The method of claim 1 wherein the computer network comprises a server, the rule being stored on the server, further comprising the step of transmitting a signal from the client computer to the server to request evaluation of the rule.

5. The method of claim 4 wherein the signal comprises information relevant to evaluation of the rule.

6. The method of claim 4 wherein the rule is predetermined by a system administrator.

7. The method of claim 1 wherein the local area network comprises a plurality of servers for hosting remote control sessions, the method further comprising the step of applying a load balancing algorithm to select a server to host a client computer session if the access method selected requires a host server.

8. The method of claim 1 further comprising the step of examining a preset configuration, the preset configuration directing at least one of the following steps:
   (a) selecting a particular access method,
   (b) prompting a user to select an access method, and
   (c) evaluating the rule to select the access method.

9. A method for selecting an access method for a user operating a client computer which is connected to a local area network, the client computer having an operating system with a system loader for loading application programs, comprising the steps of
   (a) the user selecting an application program,
   (b) hooking the system loader of the operating system before the application program is loaded, and
   (c) selecting an access method based upon the evaluation of at least one predetermined rule,
wherein the user is not required to participate in the selection of the access method.

10. The method of claim 9 wherein the rule expresses a relationship with a predetermined variable.

11. The method of claim 9 further comprising the step of un-pausing the system loader and allowing the application program to run if a remote node access method is selected.

12. The method of claim 9 further comprising the step of configuring the client computer and the local area network to run in remote control mode if a remote control access method is selected.

13. The method of claim 9 wherein the local area network comprises a server, the rule being stored on the server, further comprising the step of transmitting a signal from the client computer to the server to request the evaluation of the rule.

14. The method of claim 13 wherein the signal comprises information relevant to the evaluation of the rule.

15. The method of claim 9 wherein the local area network comprises a plurality of servers for hosting remote control sessions, the method further comprising the step of applying a load balancing algorithm to select a server to host the remote control session if the remote control method is selected.

16. The method of claim 9 further comprising the step of examining a preset configuration, the preset configuration directing at least one of the following steps:
   (a) selecting a particular access method,
   (b) prompting a user to select an access method, and
   (c) evaluating the rule to select the access method.

17. A system capable of selecting a communication access method in a network environment, comprising:
   (A) a local device adapted to communicate with remote devices;
   (B) at least one remote computer adapted to communicate with the local device;
   (C) a communication device connected to the remote computer and the local device, the communication device being adapted to facilitate communication between the remote computer and the local device;
   (D) an operating system installed on the remote computer, the operating system having a system loader adapted to load application programs on the remote computer;
   (E) a client program installed on the remote computer, the client program being adapted to automatically pause the system loader before the system loader loads a an application program; and
   (F) a selection program installed on the local device, the remote computer, or both, the selection program being adapted to select a communication access method for the application program to communicate with the local device.

18. The system of claim 17 wherein the selection program is adapted to prompt the user to select the application program.

19. The system of claim 17 wherein the selection program is adapted to select the communication access method based on a preset configuration.

20. The system of claim 17 wherein the selection program is adapted to evaluate at least one predetermined rule to select the communication access method.

21. The system of claim 17 wherein the selection program comprises a server program installed on the local device, wherein the server program is adapted to evaluate at least one predetermined rule to select the communication access method.

22. The system of claim 17 further comprising a local area network adapted to facilitate communication between devices connected to the local area network, the local device being connected to the local area network.

23. The system of claim 22 further comprising a plurality of devices attached to the local area network and a server program installed on the local area network, each of the devices being adapted to host the remote computer, the server program being adapted to balance usage among the devices.

24. The system of claim 23 wherein the server program comprises a load balancing algorithm, the load balancing algorithm being adapted to balance usage among the devices.

25. The system of claim 24 wherein the load balancing algorithm is adapted to offer new loads to the devices attached to the local area network.

26. The system of claim 17 wherein the client program is adapted to first allow a user of the remote computer to select an application program and then pause the system loader before the application is loaded if the application program is a predetermined application program.

27. A system for facilitating communication between a remote device and devices on a local area network, comprising:
   (A) a local area network, comprising:
      (a) a plurality of local devices; and
      (b) a local area network connection connected to the local devices, the connection being adapted to facilitate communication between the local devices;
   (B) at least one remote computer adapted to communicate with the local area network;
   (C) a communication device connected to the remote computer and the local area network, the communication device being adapted to facilitate communication between the remote computer and the local area network;
   (D) an operating system installed on the remote computer, the operating system having a system loader, the system loader being adapted to load application programs;
   (E) a client program installed on the remote computer, the client program being adapted to pause the system loader before the system loader loads an application program; and (F) a selection program installed on the local area network, the remote computer, or both, the selection program being adapted to select a communication access method for allowing the application program to communicate with the local area network.

28. The system of claim 27 wherein the selection program is adapted to prompt the user to select the application program.

29. The system of claim 27 wherein the selection program is adapted to select the communication access method based on a preset configuration.

30. The system of claim 27 wherein the selection program is adapted to evaluate at least one predetermined rule.

31. The system of claim 27 wherein the selection program comprises a server program installed on the local device, wherein the server program is adapted to evaluate at least one predetermined rule to select the communication access method.

32. The system of claim 27 further comprising a server program installed on at least one of the local devices in the local area network, the server program being adapted to balance usage among the local devices.

33. The system of claim 32 wherein the server program comprises a load balancing algorithm, the load balancing algorithm being adapted to balance usage among the devices in the local area network.

34. The system of claim 33 wherein the load balancing algorithm is adapted to offer new loads to the devices in the local area network.

35. The system of claim 27 wherein the client program is adapted to first allow a user of the remote computer to select an application program and then pauses the system loader before the application is loaded if the application program is a predetermined application program.

* * * * *